United States Patent
Hwu et al.

(10) Patent No.: US 7,302,557 B1
(45) Date of Patent: Nov. 27, 2007

(54) METHOD AND APPARATUS FOR MODULO SCHEDULED LOOP EXECUTION IN A PROCESSOR ARCHITECTURE

(75) Inventors: Wen-mei W. Hwu, Champaign, IL (US); Matthew C. Merten, Champaign, IL (US)

(73) Assignee: Impact Technologies, Inc., Champaign, IL (US)

( * ) Notice: Subject to any disclaimer, the term of this patent is extended or adjusted under 35 U.S.C. 154(b) by 294 days.

(21) Appl. No.: 09/728,441

(22) Filed: Dec. 1, 2000

Related U.S. Application Data

(60) Provisional application No. 60/173,183, filed on Dec. 27, 1999, provisional application No. 60/200,589, filed on Apr. 28, 2000.

(51) Int. Cl.
  *G06F 9/30* (2006.01)
  *G06F 9/45* (2006.01)
(52) U.S. Cl. ..................... 712/241; 717/160
(58) Field of Classification Search ............... 712/241, 712/244; 717/150, 160, 161
See application file for complete search history.

(56) References Cited

U.S. PATENT DOCUMENTS

| | | | | |
|---|---|---|---|---|
| 4,626,988 A | * | 12/1986 | George ..................... | 712/241 |
| 5,579,493 A | * | 11/1996 | Kiuchi et al. ............... | 712/207 |
| 5,664,193 A | * | 9/1997 | Tirumalai ................... | 717/153 |
| 5,809,308 A | * | 9/1998 | Tirumalai ................... | 717/161 |
| 5,835,776 A | * | 11/1998 | Tirumalai et al. ........... | 717/161 |
| 5,867,711 A | * | 2/1999 | Subramanian et al. ...... | 717/161 |
| 5,898,849 A | * | 4/1999 | Tran .......................... | 712/203 |
| 5,898,865 A | * | 4/1999 | Mahalingaiah ............. | 712/239 |
| 6,076,159 A | * | 6/2000 | Fleck et al. ................. | 712/241 |
| 6,085,315 A | * | 7/2000 | Fleck et al. ................. | 712/241 |
| 6,269,440 B1 | * | 7/2001 | Fernando et al. ........... | 712/241 |
| 6,367,071 B1 | * | 4/2002 | Cao et al. .................... | 717/160 |
| 6,421,744 B1 | * | 7/2002 | Morrison et al. ............. | 710/22 |
| 6,598,155 B1 | * | 7/2003 | Ganapathy et al. ......... | 712/241 |
| 6,832,306 B1 | * | 12/2004 | Ganapathy et al. .......... | 712/41 |
| 6,988,190 B1 | * | 1/2006 | Park ........................... | 712/241 |

OTHER PUBLICATIONS

Madhavi Gopal Valluri and R. Govindarajan. "Modulo-Variable Expansion Sensitive Scheduling". High Performance Computing, 1998. HIPC '98. 5th International Conference on, Dec. 17-20, 1998. pp. 334-341.*

(Continued)

*Primary Examiner*—Eddie Chan
*Assistant Examiner*—Aimee J Li
(74) *Attorney, Agent, or Firm*—Pillsbury Winthrop et al.

(57) ABSTRACT

A processor method and apparatus that allows for the overlapped execution of multiple iterations of a loop while allowing the compiler to include only a single copy of the loop body in the code while automatically managing which iterations are active. Since the prologue and epilogue are implicitly created and maintained within the hardware in the invention, a significant reduction in code size can be achieved compared to software-only modulo scheduling. Furthermore, loops with iteration counts less than the number of concurrent iterations present in the kernel are also automatically handled. This hardware enhanced scheme achieves the same performance as the fully-specified standard method. Furthermore, the hardware reduces the power requirement as the entire fetch unit can be deactivated for a portion of the loop's execution. The basic design of the invention involves including a plurality of buffers for storing loop instructions, each of which is associated with an instruction decoder and its respective functional unit, in the dispatch stage of a processor. Control logic is used to receive loop setup parameters and to control the selective issue of instructions from the buffers to the functional units.

29 Claims, 11 Drawing Sheets

OTHER PUBLICATIONS

InstantWeb. Online Computing Dictionary. Search term: interrupt http://www.instantweb.com/foldoc/foloc.cgi?query=interrupt.*

P. Tirumalai, M. Lee, and M. Schlansker. "Parallelization of Loops with Exits on Piplined Architecutures". Supercomputing '90. Processdings of, Nov. 12-16, 1990. pp. 200-212.*

Uma Mahadevan, Kving Nomura, Roy Dz-ching Ju, and Rick Hank. "Applying Data Speculation in Modulo Scheduled Loops". Parallel Architectures and Compilation Techniques, 2000. Proceedings International Conference on, Oct. 15-19, 2000. pp. 169-176.*

Tanebaum, Andrew S. "Structured Computer Organization". Second Edition. Englewood Cliffs, NJ: Prentice-Hall, Inc., © 1984. pp. 10-12.*

B. R. Rau and C. D. Glaeser, Some Scheduling Techniques and An Easily Schedulable Horizonal Architecture for High Performance Scientific Computing, in *Proceedings of the 20th Annual Workshop on Microprogramming and Microarchitecture*, pp. 183-198, Oct. 1981.

J. C. Dehnert, P. Y. Hsu, and J. P. Bratt, Overlapped Loop Support in the Cydra 5, in *Proceedings of the 3rd International Conference on Architectural Support for Programming Languages and Operating Systems*, pp. 26-38. Apr. 1989.

TMS320C6000 CPU and Instruction Set Reference Guide, Tech. Rep. SPRU189F, Texas Instruments, Oct. 2000, Chapters 1 and 2.

TMS320C6000 Programmers Guide, Rep. SPRU198G, Texas Instruments, Aug. 2002, pp. 5-32 to 5-149.

M. S. Lam, Software pipelining: An effective scheduling technique for VLIW machines, in *Proceedings of the ACM SIGPLAN 1998 Conference on Programming Language Design and Implementation*, pp. 318-328, Jun. 1998.

B. R. Rau, M. S. Schlansker, and P. Tirumalai, Code generation schemas for modulo scheduled do-loops and white-loops, Tech. Rep. HPL-92-47, Hewlett Packard Labs, Apr. 1992.

D. M. Lavery, *Modulo Scheduling for Control-Intensive General-Purpose Programs*. Ph.D. thesis, Department of Electrical and Computer Engineering, University of Illinois, Urbana, IL, 1997.

* cited by examiner

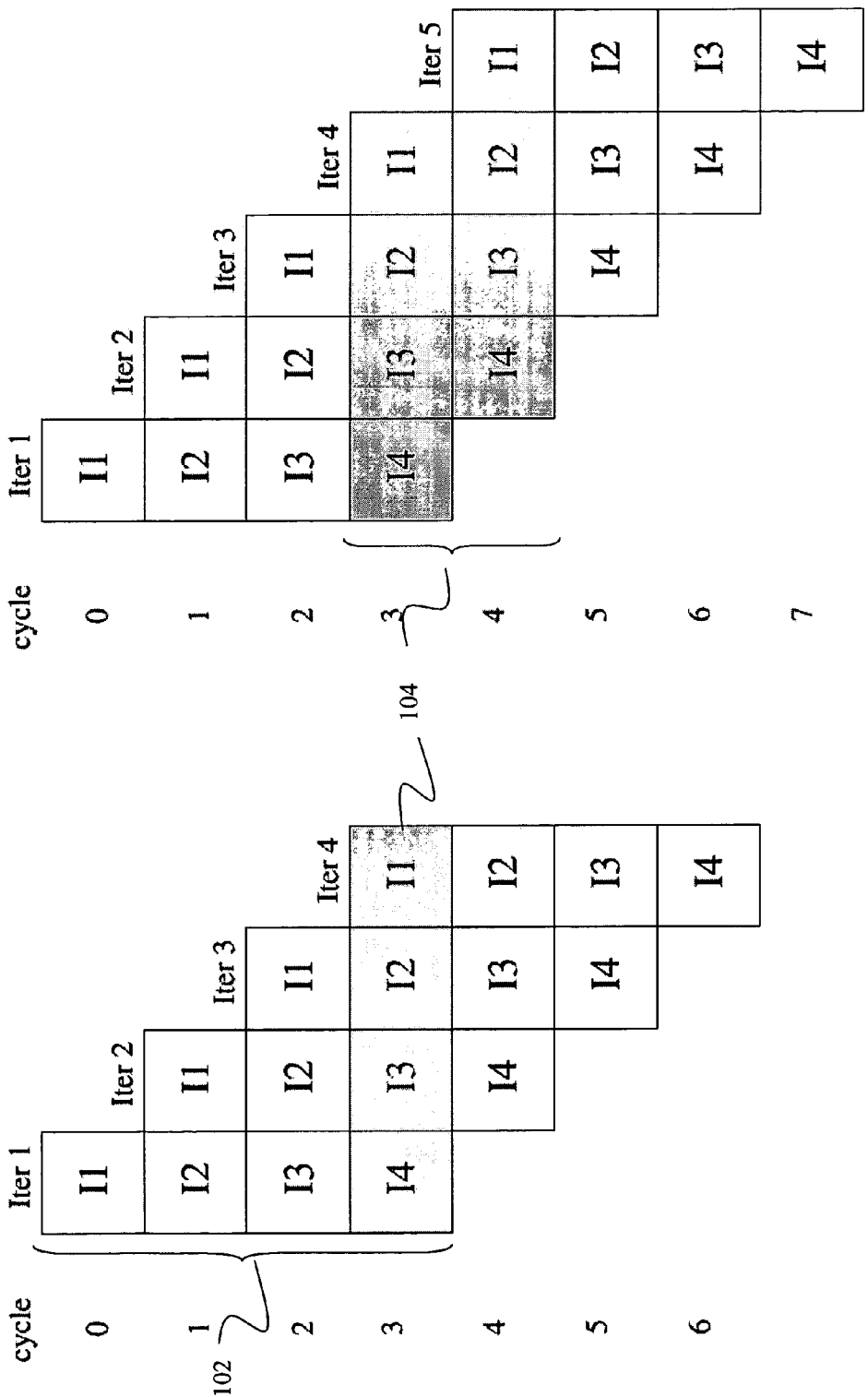

| cycle | RTL |
|---|---|
| 0 | r1 <- 0 |
| 1 | r1 <- r1 * 5 |
| 2 | r1 <- r1 + 4 |
| 3 | st [r2], r1 |
| 4 | st [r3], r1 |

| inst. | latency |
|---|---|
| mul | 3 |
| add | 1 |

FIG. 9

EQ model or
LE model w/ actual
MUL latency of 3

| cycle | RTL | |
|---|---|---|
| 0 | (r1) <- 1 | |
| 1 | (r1) <- (r1) * 5 | |
| 2 | (r1) <- (r1) + 8 | |
| 3 | st [r2], (r1) | ; store 9 into [r2] |
| 4 | st [r3], (r1) | ; store 5 into [r3] |

FIG. 10A

EQ model w/ int. after cycle 2 or
LE model w/ actual
MUL latency of 2

| cycle | RTL | |
|---|---|---|
| 0 | (r1) <- 1 | |
| 1 | (r1) <- (r1) * 5 | |
| 2 | (r1) <- (r1) + 8 | |
| 3 | st [r2], (r1) | ; store 5 or 9 into [r2] |
| 4 | st [r3], (r1) | ; store 5 or 9 into [r3] |

FIG. 10B

EQ model w/ int. after cycle 1 or
LE model w/ actual
MUL latency of 1

| cycle | RTL | |
|---|---|---|
| 0 | (r1) <- 1 | |
| 1 | (r1) <- (r1) * 5 | |
| 2 | (r1) <- (r1) + 8 | |
| 3 | st [r2], (r1) | ; store 13 into [r2] |
| 4 | st [r3], (r1) | ; store 13 into [r3] |

FIG. 10C (a) Traditional register allocation of the loop body.

(b) Modulo schedule-aware register allocation of the loop body.

METHOD AND APPARATUS FOR MODULO SCHEDULED LOOP EXECUTION IN A PROCESSOR ARCHITECTURE

CROSS REFERENCE TO RELATED APPLICATIONS

The present application is based on, and claims priority from, U.S. Provisional Application No. 60/173,183, filed Dec. 27, 1999 and U.S. Provisional Application No. 60/200,589, filed Apr. 28, 2000, commonly owned by the present assignee, the contents of which are incorporated herein by reference.

FIELD OF THE INVENTION

The present invention relates generally to the field of processor architectures, and more specifically, to a processor architecture for modulo scheduled loop execution.

BACKGROUND OF THE INVENTION

Many computer programs spend a significant percent of their total execution time executing in loops. Therefore, reducing the time required to execute the loops in a program can dramatically reduce the time required to execute an entire program. One such loop optimization technique, called software pipelining, aims to reduce loop execution time by overlapping the execution of several iterations of the loop, thus increasing instruction-level parallelism. Specifically, modulo scheduling algorithms periodically begin the execution of a loop iteration before previous loop iterations have completed executions, starting a new loop iteration once every initiation interval (II) processor cycles. Thus, the throughput is one iteration every II cycles after some initial startup cycles.

Consider the examples depicted in FIGS. 1A and 1B. In both examples, the loop body 102 consists of four single-cycle latency instructions I1, I2, I3 and I4. In FIG. 1A, there are four iterations of the loop (Iter1 to Iter4), with a new iteration beginning each cycle. In cycle zero, I1 of the first loop iteration executes. In cycle one, I2 of the first loop iteration executes along with I1 of the second loop iteration, and so on. Notice that in cycle three, each of the four instructions in the loop is executed, although on behalf of four different iterations of the loop. When each of the instructions in the loop is executed in the same cycle on behalf of different loop iterations (or in the same stage, as will be discussed later), it is called the kernel 104. In cycle four, the first loop iteration is complete, and I4, I3, and I2 of the second, third, and fourth loop iterations execute, respectively.

In FIG. 1B, five loop iterations need to be executed, beginning a new iteration each cycle. Notice that the code executed in cycle four is identical to the code executed in cycle three. Thus to execute more loop iterations, the kernel 104 need only be executed additional times. In particular, notice that the code leading up to the kernel 104 and away from the kernel is the same for both FIG. 1A and FIG. 1B.

FIG. 2 depicts the code for any loop with four instructions (I1, I2, I3 and I4) and an iteration count N greater than three. The code that builds up to the kernel 104 is called the prologue 202 and the code that finishes the iterations after the kernel 104 is called the epilogue 204. While the kernel itself contains a single copy of each instruction in the loop, the epilogue and prologue contain multiple copies, thus dramatically increasing the total size of the code.

Conventional approaches to reducing the code size problems associated with the prologue and epilogue are unsatisfactory. For example, the prologue and epilogue may be omitted in certain architectures by the heavy use of prediction. However, extensive support for prediction often dramatically increases hardware cost and design complexity of the architecture. Alternatively, with some clever data layout and instruction scheduling (specifically of the backward branch instruction), portions of the prologue and epilogue may be eliminated, but this is not always possible.

FIG. 3 depicts the loop instructions from the view of the functional units, rather than from the view of the iterations. As shown in FIG. 3, instruction I1 of the first loop iteration (surrounded by line 302) is executed in cycle zero by functional unit 0 (FU0). In cycle one, the execution of I2 of the first iteration is not executed in FU0 but rather in FU1, while functional unit FU0 begins the processing of I1 for the second loop iteration. Execution of the loop occurs in steps, where the resulting data from one functional unit is handed off to another, each performing a little more work on the iteration. Hence, the name "Software Pipelining" is given to this type of instruction scheduling.

Often, an initiation interval (II) of one cycle is not achievable due to scheduling constraints. FIGS. 4A and 4B depict a loop that has an II of two cycles, thus a new iteration of the loop is started once every two cycles. The loop is broken up into stages of II cycles in each stage (the stages for the first loop iteration 402 are labeled in the figure). For example, while executing stage 2 of the first loop iteration 402, stage 1 of the second loop iteration 404 begins executing. Furthermore, it is not a requirement that only one instruction be executed in each cycle for a given loop iteration. For example, as shown in FIG. 4A, two instructions 406 are executed by functional units 3 and 4 in the second cycle of the first stage, both on behalf of the same loop iteration. Likewise, no instructions are executed for any functional units in the second cycle of the second stage 408. However, as can be seen, even though no resources are used for the second cycle in the second stage 408 for the first loop iteration 404, the functional units are executing instructions associated with the second cycle of the first stage of second loop iteration 404.

The compiler physically generates the prologue, kernel, and epilogue code, for the loop to be executed by the functional units as shown in FIG. 4B. The total size of the code for executing the loop is roughly equivalent to the number of overlapped loop iterations in the kernel 104 times the number of instructions 402 in a single loop iteration, or alternatively the number of instructions in the kernel 104 times the number of stages. Furthermore, if the iteration count of the loop is ever less than the number of concurrent iterations in the kernel, then for traditional modulo scheduling, the compiler needs to generate extra code to skip over the kernel into the epilogue from the prologue.

Kernel-only modulo scheduling is a technique that eliminates the need for an explicitly generated prologue and epilogue through the use of predication and a rotating register file in the processor architecture. With predicated execution, each instruction is conditionally executed based on the value of a Boolean predicate. Just prior to execution of an instruction, the register that contains the Boolean predicate is read, and if true the instruction executes. Otherwise, the instruction is nullified and turned into a no operation (nop). In kernel-only modulo scheduling, each stage of execution is assigned a single predicate register that can be set to true or false, depending on whether the stage should executed in the cycle or not. Specifically, the instructions associated with the stage are conditionally executed based their stage's predicate. See, for example, B. R. Rau and C. D. Glaeser, "Some Scheduling Techniques and An Easily Schedulable Horizontal Architecture for High Performance Scientific Computing," in *Proceedings of the 20th Annual Workshop on Microprogramming and Microarchitecture*, pp. 183-198, October 1981; and J. C. Dehnert, P. Y. Hsu, and J. P. Bratt, "Overlapped Loop Support in the Cydra 5," in *Proceedings of the 3rd International Conference on Architectural Support for Programming Languages and Operating Systems*, pp. 26-38, April 1989.

Considering the first loop iteration 102 in FIGS. 1A and 1B, suppose that instructions I1 through I4 are predicated on Boolean predicate variables P1 through P4 respectively. Then cycle 0 of the prologue can be executed by actually executing the kernel 104 with P1 set to true, while the others are set to false. Cycle 1 of the prologue can be executed by executing the kernel 104 with P1 and P2 set to true, while the others are set to false. Likewise, the rest of the prologue and the epilogue can be executed by executing only the kernel 104 with the appropriate Boolean predicates set to true.

In kernel-only modulo scheduling, either the modulo scheduled software loop itself can maintain and update the appropriate predicates to execute the prologue and epilogue from the kernel, or the hardware can do so through the use of a rotating register file. With such hardware, the Boolean predicate for the first stage must be set by the software, but the hardware automatically sets the predicate to true for the second stage for the next kernel iteration. In other words, by setting the predicate to true for the first stage, the hardware automatically enables the remaining stages to complete the loop iteration during successive executions of the kernel. This method relies heavily upon the architectural technique of predication, and optionally requires the use of a rotating predicate register file for efficient implementation. However, only the kernel with appropriate predicated instructions must be present in the program, meaning the code size of the loop is roughly equal to that of a single iteration plus the cost of encoding the Boolean predicate identifiers with each instruction. In addition, code size expansion may result from encoding the rotating register file specifier extensions or explicit instructions for manipulating the predicates.

Unroll-based scheduling is also a technique for overlapping the execution of loop iterations. In this method, several iterations of the loop are unrolled (or duplicated) and placed after one another in the program. This new, longer sequence of instructions forms a new loop (called an unrolled loop) in which multiple iterations of the original loop are executed in each iteration of the unrolled loop. Consequently, the number of iterations of the unrolled loop is reduced in comparison with the number of iterations of the original loop. In order to reduce the time required to execute the loop, the instructions from the various original iterations now in the unrolled loop can be mixed and scheduled together, effectively overlapping iterations.

This technique differs from modulo scheduling in that loop iterations are not periodically initiated. Rather, a number of loop iterations are started at the beginning of the unrolled loop, then all allowed to complete before a new set of iterations are allowed to begin (a new iteration of the unrolled loop). Typically, the various loop iterations placed in the unrolled loop cannot be perfectly mixed together, resulting in idle functional units toward the beginning and ending of the unrolled loop body. Essentially, no original loop iterations are executing across the back edge of the unrolled loop. By waiting for all of the original iterations in the unrolled loop to complete before starting a new set of iterations, cycles are wasted that could be used to begin new iterations. The modulo scheduling technique is capable of starting new iterations when functional units are available, albeit at the cost of increased analysis and scheduling complexity within the compiler. Unroll-based scheduling is a competing approach to modulo scheduling.

Zero-overhead loop buffers are a hardware technique for executing loop iterations without having to fetch the loop body from the memory system for each iteration by storing a copy of the loop body in a dedicated buffer, thus reducing power and simplifying the instruction fetch process. The technique also is combined with special branch instructions that manage the remaining loop iteration count in the hardware (called hardware loop semantics), without requiring instructions in the loop body to maintain the count. This method is capable of supporting loops generated by the unroll-based scheduling technique, and possibly modulo scheduled loops if predication support is available.

What continues to be needed in the art, therefore, is a method and apparatus that enables overlapping execution of loop iterations in a processor architecture without expanding the size of the code beyond the size of the kernel for executing the prologue and epilogue or for accounting for loop iterations less than the number of concurrent iterations in the kernel, and without dramatically increasing hardware cost and design complexity of the architecture. The present invention fulfills this need, among others.

SUMMARY OF THE INVENTION

It is therefore an object of the invention to overcome the above-described problems in the prior art.

It is another object of the invention to expose the sequential code version, rather than the kernel version, of the loop to the architecture while still overlapping the execution of loop iterations.

It is another object of the invention to generate the prologue and epilogue internal to the micro-architecture without exposing the architecture to specific prologue and epilogue codes.

It is another object of the invention to reduce the code necessary to instruct a processor to perform a loop of instructions.

To achieve these objects and others, a method and apparatus according to the present invention allows the compiler to include only a single copy of the loop in the code while automatically managing which iterations are active. Since the prologue and epilogue are implicitly created and maintained within the hardware in the invention, a significant reduction in code size can be achieved. Furthermore, loops with iteration counts less than the number of concurrent iterations present in the kernel are also automatically handled. This hardware enhanced scheme achieves the same performance as the fully-specified standard modulo scheduling method. Furthermore, the hardware reduces the power requirement as the entire fetch unit can be deactivated for a portion of the loop's execution. According to one example of the invention, a plurality of modulo scheduling buffers for storing loop instructions are provided, each of which is associated with an instruction decoder and its respective functional unit, in the dispatch stage of a processor. Control logic is used to receive loop setup parameters and to control the selective issue of instructions from the buffers to the functional units.

Accordingly, the modulo scheduling buffer of the present invention builds upon the zero-overhead loop buffer concept by storing a copy of the modulo scheduled loop in hardware, simplifying the instruction fetch process. It also builds upon the kernel-only modulo scheduling approach with rotating predicate registers by allowing the hardware to maintain and manage which stages of the modulo scheduled loop are executing in a particular cycle. Furthermore, the present approach requires the code size of a single iteration of the loop while utilizing the modulo scheduling technique, like that of kernel-only modulo scheduling, but without the cost of storing the predicate identifiers.

BRIEF DESCRIPTION OF THE DRAWINGS

The foregoing and other features, aspects, and advantages of the present invention will become more apparent from the following detailed description when read in conjunction with the following drawings, wherein:

FIGS. 1A and 1B illustrate execution of a number of iterations of loop instructions;

FIG. 9 illustrates the equals model for scheduling for non-unit assumed latency architectures;

FIGS. 10A, 10B and 10C illustrate the less than or equals model for scheduling for non-unit assumed latency architectures;

DETAILED DESCRIPTION OF THE PREFERRED EMBODIMENTS

The present invention will now be described in detail with reference to the accompanying drawings, which are provided as illustrative examples of preferred embodiments of the present invention. Notably, the figures and examples provided below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 5:
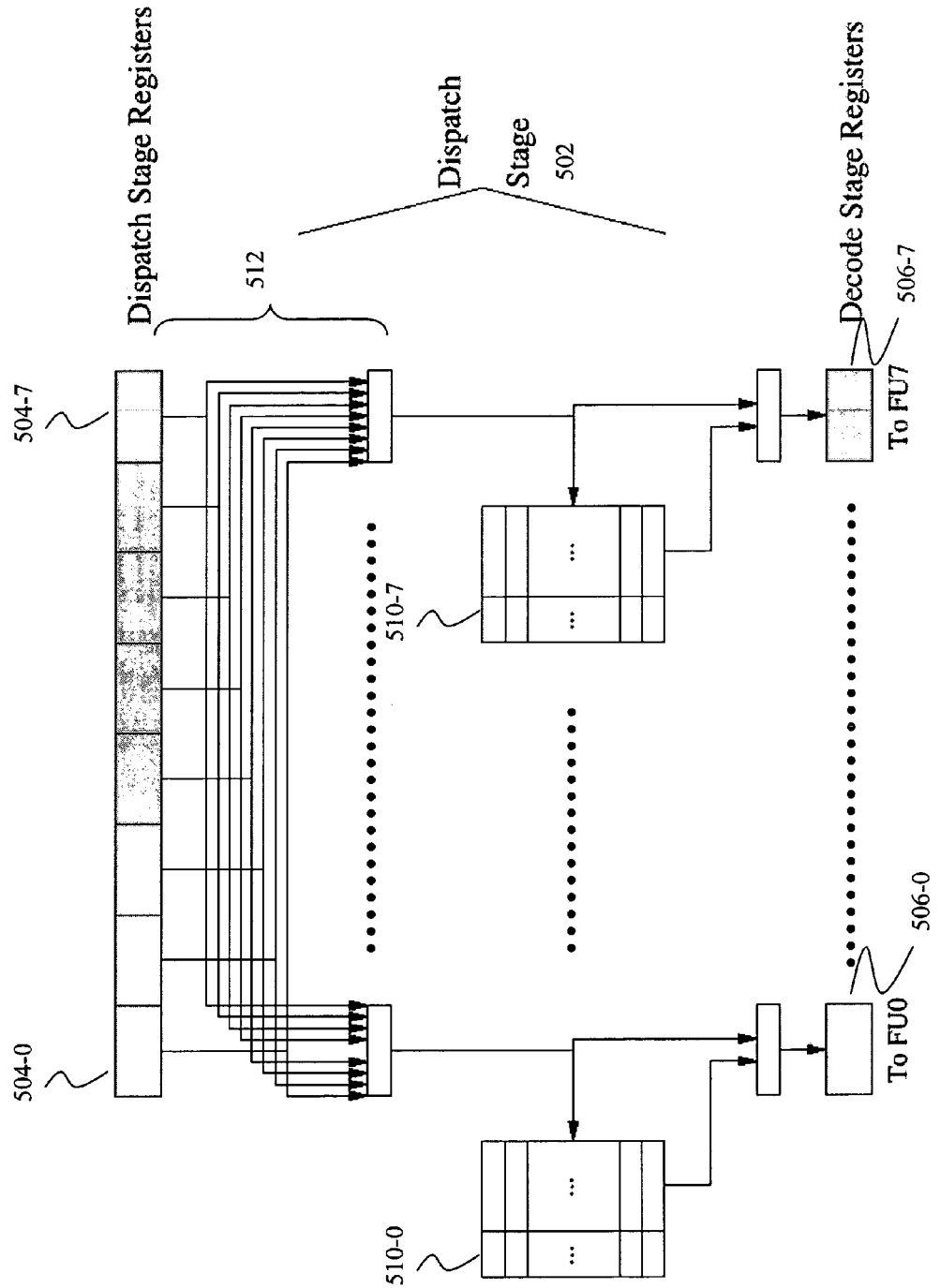
FIG. 5 illustrates a portion of a processor including a dispatch stage in accordance with an example implementation of the present invention.

FIG. 5 illustrates an example implementation of the present invention. This example implementation is based on the Texas Instruments TMS320C6x (TI 'C6x) architecture. Although described in detail in connection with the TI 'C6x architecture, those of skill in the art will understand how to adapt the implementation described herein to other processor architecture such as x86, Pentium, SPARC, PowerPC, MIPS, SHARC, LSI Logic, StarCore, Mcore, and Itanium. Accordingly, the example implementation described herein is intended as illustrative rather than limiting. For example, although FIG. 5 illustrates an example implementation in an architecture including decode stage registers, it should be apparent that other architectures not including decode stage registers may be adapted for use with present invention, as will be understood by those skilled in the art after being taught by the present disclosure. In such a case, the instructions issued from the dispatch stage to the functional units, rather than being unencoded instructions will be decoded instructions in the form of functional unit control signals.

As is known, in the TI 'C6x architecture, the dispatch stage of the pipeline consists of a network that routes instructions in the fetch packet (eight aligned instructions) to their correct functional units. See, for example, the "TMS320C6000 CPU and Instruction Set Reference Guide," Tech. Rep. SPRU1691, Texas Instruments, March 1999, the contents of which are incorporated herein by reference.

Figures 2, 3:
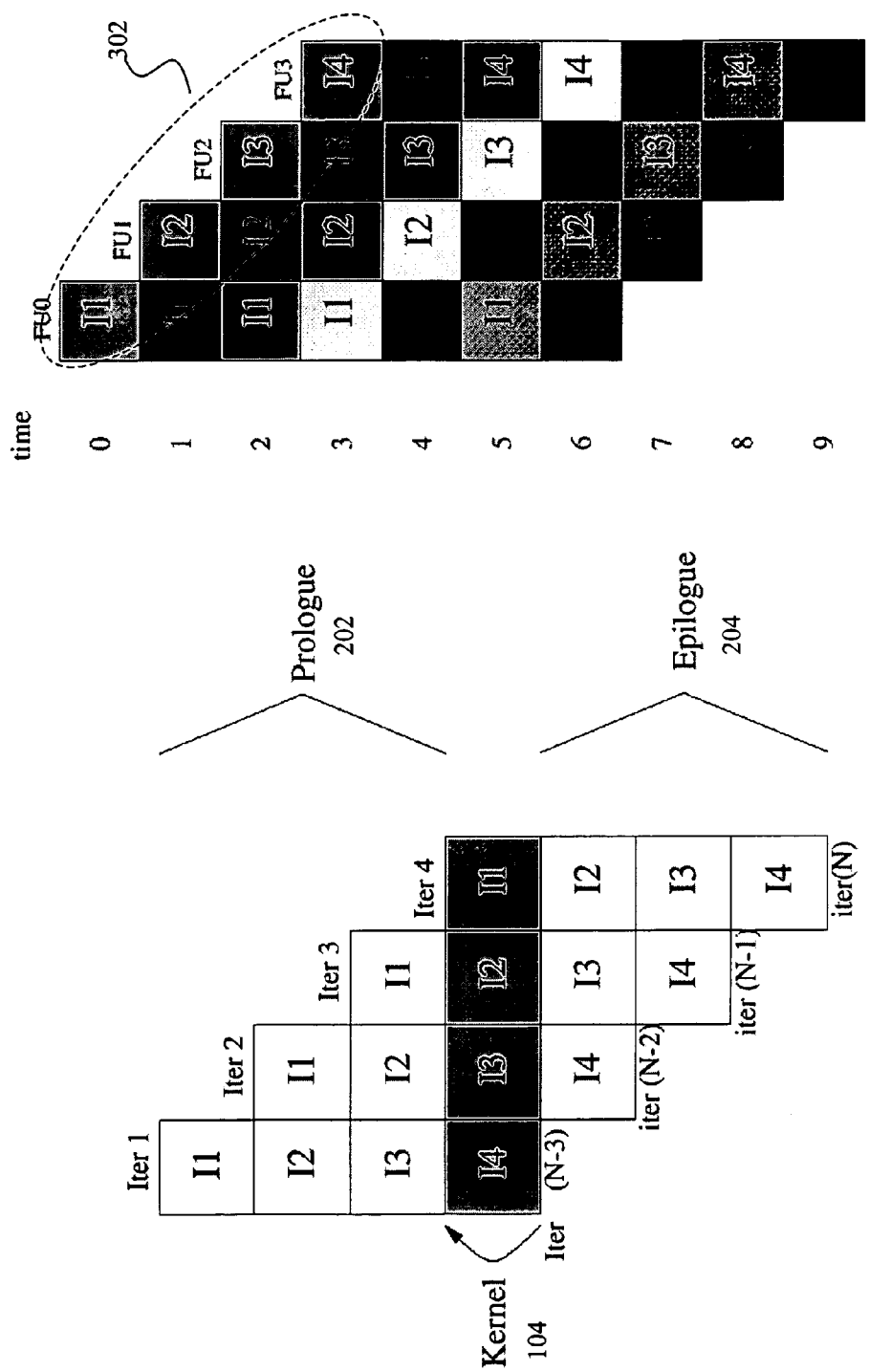
FIG. 2 illustrates the prologue, kernel and epilogue portions of a loop with a number of iterations.
FIG. 3 illustrates a loop from the standpoint of functional units for executing the loop instructions.
Figures 4A, 4B:
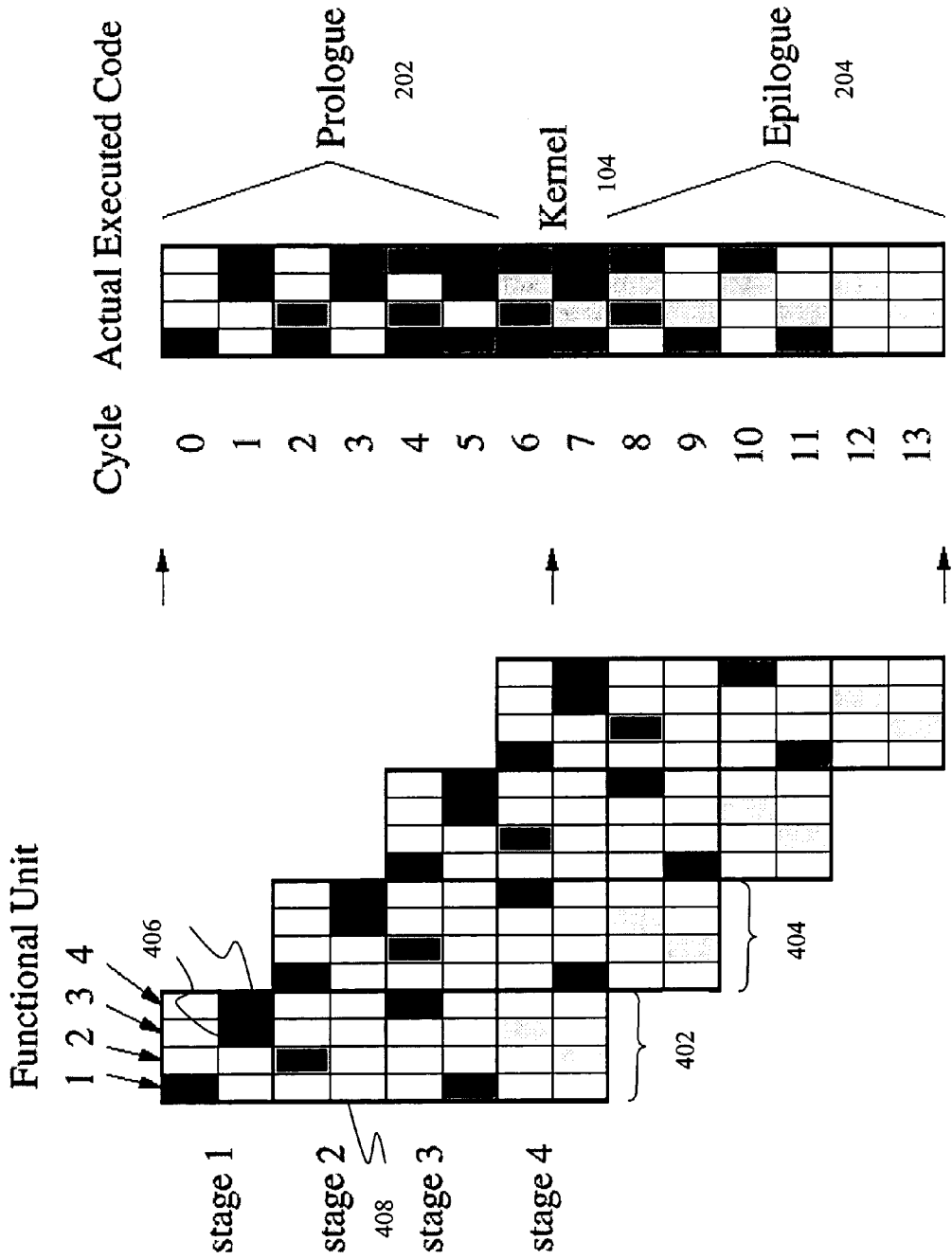
FIGS. 4A and 4B illustrate a loop with a number of stages per iteration, and multiple cycles per stage.

Dispatch stage 502 of the present invention shown in FIG. 5, as in the conventional architecture, includes a routing network 512 from each instruction dispatch register 504-0 to 504-7 to each instruction decode register 506-0 to 506-7 (beginning of the path to each associated functional unit FU0 to FU7). Also, as in the conventional architecture and as illustrated in FIG. 4B, the assembler insures that there is only a single instruction in each execute packet (subset of the instructions in the fetch packet that can be issued in parallel) for any functional unit; i.e. there is no hardware contention for the routing wires or the functional units in a given cycle. This is because in the 'C6x hardware, there must be a dispatch register for each instruction in an execute packet, while there must at least as many decoders and functional units as there are instructions in an execute packet. In other words, some implementations may have more decoders and function units than possible instructions in an execute packet, but there must be at least enough decoders and function units to accommodate every possible allowed combination of instructions in the packet. Initially, the 'C6x hardware and algorithms were designed to function correctly on unroll-based scheduled loops as well as modulo scheduled loops, but explicit prologue and epilogue code were required for the latter.

As will be discussed in more detail below, rather than needing to specify each of the prologue, kernel, and epilogue in the user code provided to the hardware, the present invention allows only a single copy of the loop to be specified in the code and uses special hardware to collect the instructions, thereby allowing the prologue, kernel, and epilogue to be formed at runtime. As will be explained in more detail below, the compiler understand that the execution of the loop iterations will overlap and properly schedules and inserts any necessary no operation instructions (NOPs) to prevent resource contention.

In accordance with the present invention and in contrast with the prior art, therefore, as shown in FIG. 5 the dispatch pipeline stage 502 further includes modulo schedule buffers (MSBs) 510-0 to 510-7 and associated control logic (not shown) that collect the fetched instructions for selective and subsequent issue to the functional units. Each MSB 510 consists of an array of entries indexed by the current cycle of the executing stage of the modulo scheduled loop. The number of entries in the buffer 510 is a design choice, for example 32, with the choice of entries limiting the modulo scheduled loops that can use the MSBs to those which have equal or fewer cycles per stage than the number of entries.

Figure 6:
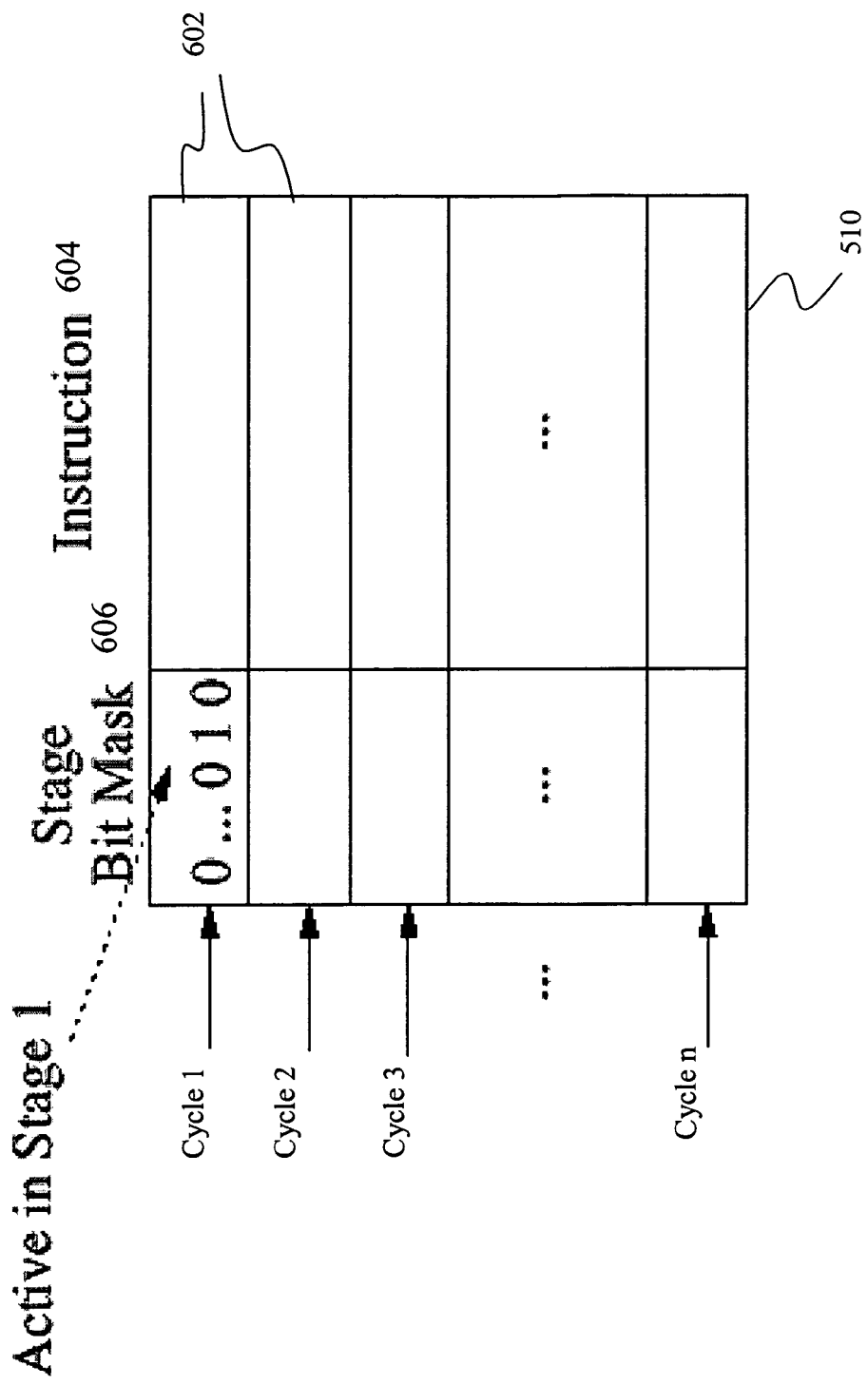
FIG. 6 illustrates a modulo schedule buffer in accordance with the present invention.

As shown in FIG. 6, each buffer entry 602 in MSB 510 consists of an instruction 604 and a stage bit mask field 606 indicating the stage to which the instruction belongs (e.g. as shown in FIG. 6 a "1" in the second significant bit position indicates that the instruction is active in stage 1 of the loop, and a "0" in the first significant bit position indicates that the instruction is inactive in stage 0 of the loop). During the first iteration of the loop, all instructions to be executed by the functional unit associated with MSB 510 during the loop are both issued to the functional unit and inserted into the instruction portion 604 of different entries 602 in MSB 510 and tagged with their appropriate stage of execution via bit mask field 606 for subsequent issue to the functional unit. The different entries 602 correspond to the n different cycles within a stage of the modulo scheduled loop. For example, if the loop body for one iteration of the loop consists of four stages and there are two cycles per stage, only the first 2 entries 602 in MSB 510 will be needed for executing the loop (although certain of the entries may include NOP instructions), and only the first 4 bits (representing stages 0 through 3) of the stage bit mask 606. The specific cycle of an instruction within the first iteration can be computed by multiplying the stage number by the number of cycles per stage and then adding the cycle number. As should be apparent from this example, the number of loop stages that can be implemented is directly proportional to the number of bit positions in the stage bit mask field 606, for example, 16.

As subsequent iterations of the loop are started, instructions for those iterations are issued from MSB 510, even as instructions for the first iteration may be inserted into buffers 510 associated with other functional units for successive stages. There is never any contention for a functional unit or a buffer entry 602 in a particular cycle because the standard modulo scheduling algorithm already insures that a particular resource used in a particular cycle in a particular stage is never used in that same cycle in any other stage.

As will be explained in more detail below, in addition to loading the instructions and associated stage fields in the MSBs, three pieces of information must be passed to the control logic associated with the MSBs to correctly setup execution of the loop. First, the initiation interval (II) is needed so that new iterations of the loops may be started every II cycles. Second, the number of loop iterations (Loop Iters) to be executed must be supplied. Third, the number of cycles (Loop Cycles) required to execute a loop iteration must be supplied. These set up requirements are for traditional 'for' loops where the iteration count is known prior to execution of the loop. However, 'while' loops, where it is not known until the end of an iteration whether or not the next iteration will execute, can also be implemented. These loops are supported in the standard modulo scheduling algorithms through the use of control speculated instructions.

Figure 7:
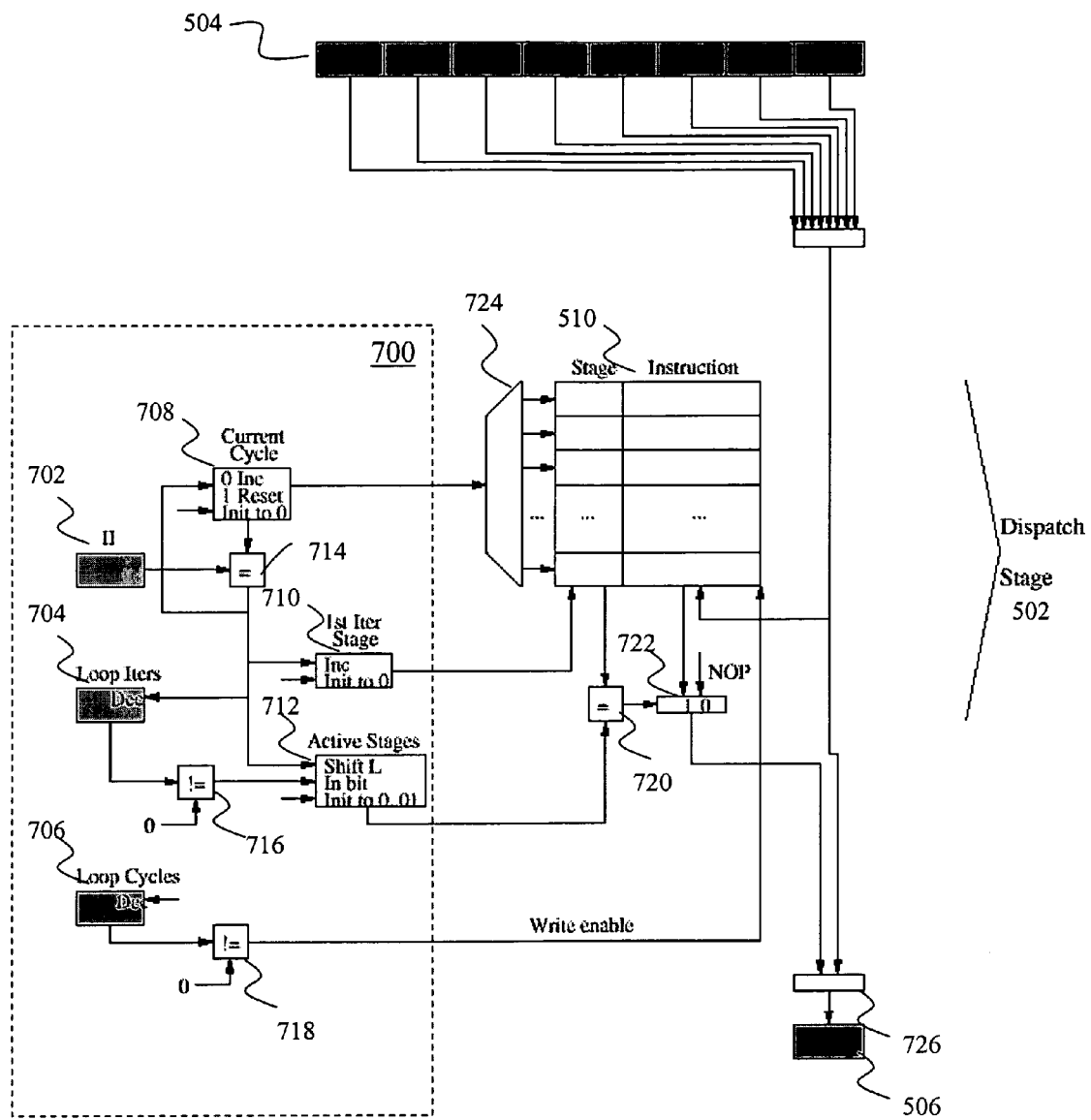
FIG. 7 illustrates control logic for controlling the selective storage and issue of loop instructions from the modulo schedule buffers in accordance with the present invention.

FIG. 7 depicts a more detailed view of a portion of the dispatch stage 502 of the processor pipeline. As shown, in addition to MSB 510, the dispatch stage includes control logic 700. In this example of the invention, there is only one set of control logic 700 for the dispatch stage of the processor, whereas the other components of the dispatch stage 502 shown in FIG. 7, such as buffer 510, are respectively provided for each functional unit.

Control logic 700 includes an initiation interval register 702 for storing the II for the loop, a loop iteration register 704 for storing the number of loop iterations (Loop Iters) to be executed, and a loop cycles register 706 for storing the number of cycles for each iteration in the loop (Loop Cycles).

A global counter 708 is used to track the current cycle of the executing stages. Whenever this counter increments to the II (as determined by comparator 714 that compares the contents of counter 708 with the contents of initiation iteration register 702), it is reset to zero, and an active signal from comparator 714 that indicates the end of the current stage is generated. The initiation interval specifies how often a new iteration is started. This is also, then, inherently the number of cycles per stage. The new iteration begins at the first cycle of the first stage, counts cycles until II is reached, at which time the current iteration enters cycle 0 of the second stage and the new iteration beings at the first cycle of the first stage. Because the II is variable across a variety of loops, extra buffer entries in MSB 510 not containing instructions for execution during the loop may exist. Thus, the comparison and reset of this counter is necessary rather than a simple modulo table indexing approach.

A first iteration stage counter 710 is used to track the current executing stage of the first loop iteration. This counter is used to tag the instructions being added to MSB 510. Each time that comparator 714 indicates the end of the current stage, this counter 710 is incremented. This counter may be implemented as a traditional counter or as a bit mask. If implemented as a traditional counter, the value must be converted into the correct bit mask when written into the tag field of an instruction entry, where the first stage has the first bit set, the second stage has the second bit set, the third stage the third bit set, etc. Otherwise, the counter may be implemented as a bit mask which is initialized to all 0s with a 1 in the first bit position indicating the first stage, and simply left shifted entering a zero in the vacated position each time the global counter 708 indicates the end of the current stage. Loop cycles register 706 is initialized with the number of cycles required to execute one iteration of the loop. This register is used to control the writing of instructions into MSB 510. Register 706 is decremented each clock cycle, and when non-zero (as determined by comparator 718), the "Accumulate First Iter Instructions" signal from comparator 718 is active, allowing for the insertion of instructions into MSB 510 from the dispatch registers 504. Some cycles may contain NOP instructions for particular functional units, requiring nothing to be written into that cycle for that functional unit. However, a later stage may write an instruction into that entry later in the iteration. Likewise, later stages are required to have NOPs for a particular cycle and functional unit when the functional unit is used by an earlier stage of another iteration. Such later stage NOPs must not write over earlier stage actual instructions. When register 706 reaches 0, there are no more instructions in the first iteration of the loop, and the accumulate signal from comparator 718 is inactive. In fact, the next instruction waiting in the instruction dispatch registers is the first instruction after execution of the entire loop. At this point, the fetch unit may be disabled, saving power, until all iterations (all of which are completely dispatched from the MSBs 510) are complete.

The active stages bit vector register 712 contains a bit for each active loop stage. The register is initialized to 0 . . . 01 (binary). The number of bits in the vector is a design choice, for example 16, which should be the same number of bits as the bit mask field 606. The initialized value of the vector indicates that only the first stage is ready to execute, in this case for the first iteration. Each time the current cycle counter 708 resets (end of stage signal from comparator 714 is active), a bit is left shifted into the register. A 1 is shifted in if the loop iteration register 704 indicates that more iterations remain to be executed, i.e. the contents of loop iteration register 704 is greater than zero (indicated by an active signal from comparator 716), otherwise a 0 is shifted in. The loop iteration register 704 is then decremented. As the bits are shifted to the left, the 1-valued bit representing an iteration executing in a particular stage proceeds to the next stage. Generally, when this bit register contains all zeros (i.e. each bit representing a stage is set to zero) for the bit positions associated with the stages for the particular loop, all iterations have completed, and execution continues after the loop with the code waiting in the dispatch registers. In an alternative implementation that also supports while loops, an evaluation of a conditional expression in the loop determines whether or not another iteration will begin. This conditional expression can not typically be evaluated until late in the iteration. The standard modulo scheduling algorithm for while loops likely begins successive iterations of the loop before knowing if they should be executed (speculatively). For these loops, a conditional evaluation that causes another iteration to execute would cause the shift of a 1 into the active stages bit register 712 rather than the iteration count register 704. When the conditional evaluates to false, a 0 is shifted in.

The proposed design currently requires that the loop back branch to the next iteration be the last instruction in the modulo scheduled loop (last cycle of the last stage), as is common with many modulo schedulers. When this is the case, the loop has complete execution when the first zero is shifted into the active stages register 712. Even though portions of other iterations may be currently executing out of the MSBs, they are speculative iterations that should not be completed, and execution can proceed with the post-loop code waiting in the dispatch registers.

As shown in the example of FIG. 7, there is additional control circuitry that is provided for each functional unit in addition to MSB 510. Decoder 724 provides the index into the MSB 510 in accordance with the current cycle stored in counter 708. Comparator 720 compares the contents of the indexed stage bit mask field for the instruction with the contents of the active stage register 712. If the 1 bit (indicating the instruction's active stage) is also set to 1 in the active stages bit mask (which contains 1 bits for all active stages), an active ("1") signal is generated, and the indexed instruction corresponding to the indexed bit mask is provided to the instruction decode register 506 (by operation of OR gate 722 and register 728). Otherwise, a NOP instruction is provided. Selector 726 selects between instructions issued to decode register 506 from the MSB 510 or directly from the dispatch stage. Selector 726 thus allows instructions to issue to the decode register 506 from the dispatch stage when processing instructions that are not using the MSBs. Furthermore, when the first iteration is executing, those instructions are written into the MSBs and passed through to the decode register 506. When instructions from other iterations are executing out of the MSBs 510, these instructions should be passed to the decode register 506. However, it should be noted that there should never be contention for a particular functional unit. When a non-NOP is issued from the dispatch registers, it must be issued to the decode register, and optionally written to the appropriate MSB when handling modulo scheduled code. Otherwise, when in modulo scheduled code and an instruction with an active stage is in an MSB, it must be issued to the decode register. A contention indicates that the compiler incorrectly modulo scheduled two instructions from different stages into the same functional unit in the same cycle.

Figure 8A:
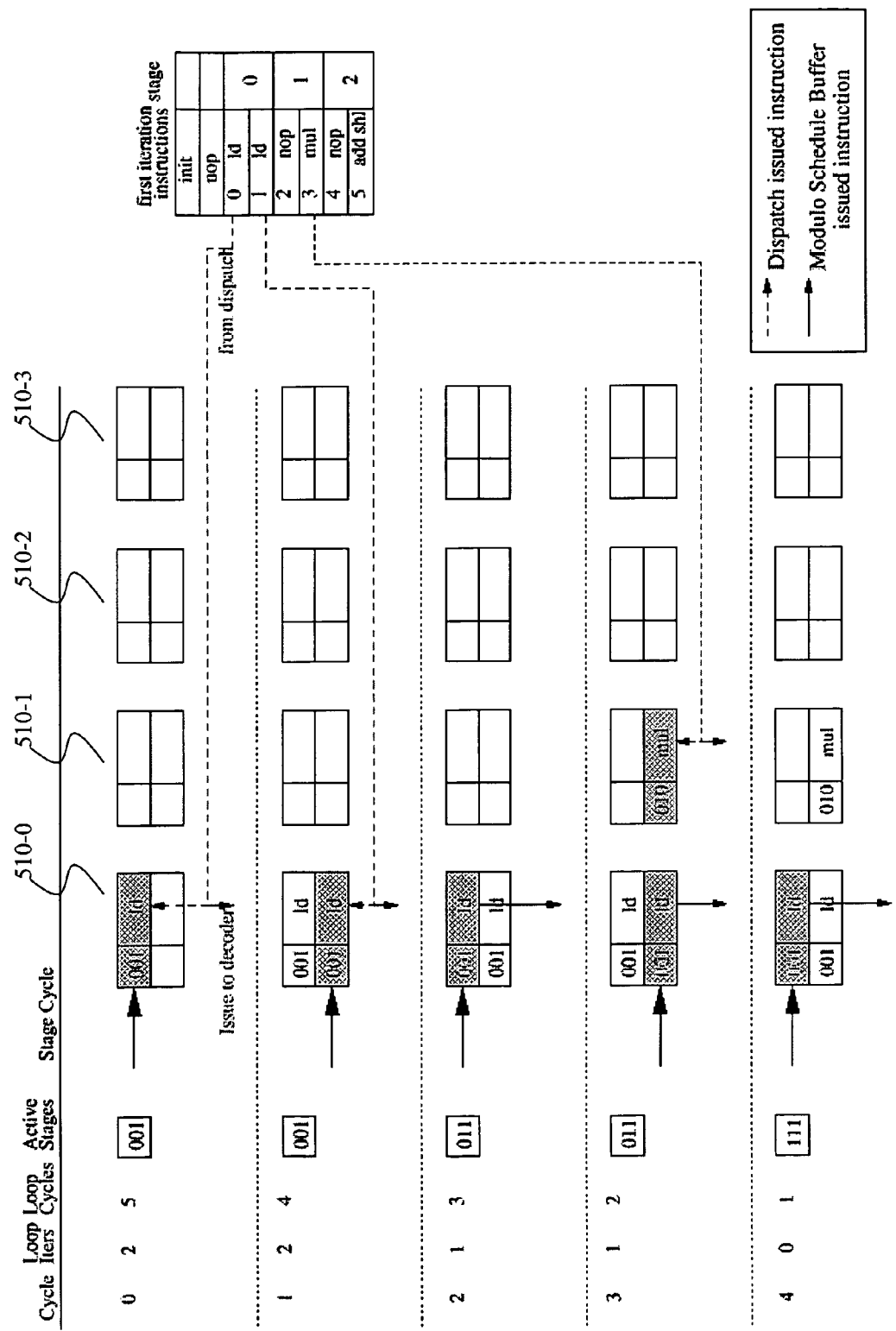
FIGS. 8A and 8B illustrate an example operation of the modulo schedule buffer scheme of the present invention.
Figure 8B:
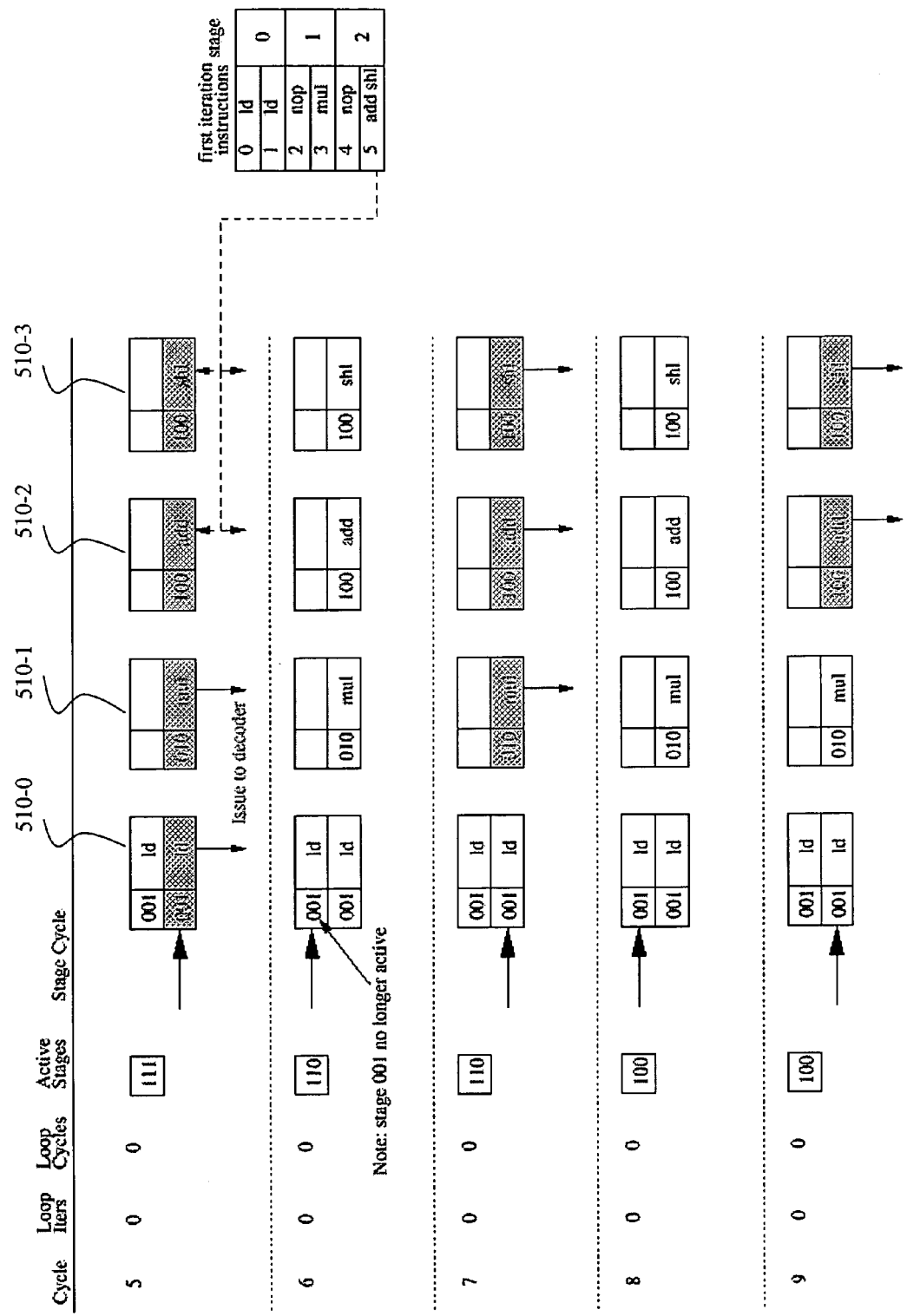

The following describes an example operation of a processor implementing the modulo scheduling buffer scheme of the present invention, as further illustrated in FIGS. 8A and 8B. The example depicts three iterations of a loop on a 4-issue machine with fully pipelined load (lat. 2), multiply (lat. 2), add (lat. 1), and shift (lat. 1) units. The loop body, as illustrated at the upper right corner of FIG. 8, consists of two loads, one multiply, one add, and one shift instruction. The loop is modulo scheduled into three stages. Thus, each iteration requires 6 cycles to execute, with a throughput of one iteration per two cycles (i.e., II=2). also, assume that all register and memory dependences have been satisfied for the modulo schedule by the scheduler. Dashed lines indicate instructions that are dispatched from the dispatch unit to the decoders and simultaneously stored into the appropriate MSB 510. Solid lines indicate stored instructions that are issued from the MSBs 510.

Pre-loop) Initialize the II (=2), Loop Cycles (=6), and Loop Iterations (=3 for three iterations of the loop) registers, all as detailed above. This happens in the S units on the TI 'C6x and the registers can be written in the EX1 stage, like other 1-cycle instructions. At this time, the instructions following the values for the loop initialization registers are already in the dispatch registers and therefore cannot be routed into the MSBs 510. Thus, another instruction, possibly a nop, must fill the slot immediately after the initialization instructions before the first loop instructions. The Loop Iters register is decremented by 1 as the first iteration is about to issue. The Active Stages bit register 712 is initialized to 0 . . . 01 to indicate that the first stage is active.

Cycle 0) The first instruction execute packet (containing the first load) in the loop is sitting in the dispatch registers ready to be routed to its decode instruction registers (functional unit). This packet may maintain from one instruction up to the issue width, or even no instructions. All instructions in this execute packet are routed and issued to the dispatch registers 504, and simultaneously inserted into their appropriate functional unit MSB 510. In this case, the load is issued and stored in the cycle 0 entry of MSB 510-0 and given a stage bit mask indicating the first stage. The Current Cycle counter 708 is incremented to the second cycle. The Loop Cycles register 706 (remaining cycles for the first iteration) is decremented to 5 more cycles.

Cycle 1) The second instruction is also a load. This is inserted into the cycle 1 entry of MSB 510-0. At the end of this cycle, the Current Cycle register 708 is reset to 0. Because the Loop Iters register 704 indicates that more loop iterations remain to be executed, a 1 bit is left shifted into the Active Stages register 712, the result of which can be seen in the cycle 2. The Loop Iters register 704 is then decremented. The first Iter Stage register 710 is incremented to 1.

Cycle 2) No instruction is added to any of the MSBs 510 because of the NOP in the schedule. However, the Load instruction for the stage 0 of the second loop iteration is automatically issued by MSB 510-0.

Cycle 3) The Mul instruction is issued and added to the second cycle entry of MSB 510-1, and the load instruction is automatically issued from MSB 510-0. The third loop iteration is ready to be initiated after this cycle.

Cycle 4) The load instruction for the third loop iteration is automatically issued from MSB 510-0.

Cycle 5) The Add and Shift instructions are issued from the dispatch registers and added to MSBs 510-2 and 510-3 from the dispatch, and the second load instruction for the third iteration and the Mul instruction for the second loop iteration are automatically issued from MSBs 510-0 and 510-1, respectively. There are no more iterations left to initiate as the Loop Iters register 704 is at 0. Shift a 0 into the Active Stages Register 712. Any instructions tagged with the first stage will no longer be issued; i.e. no load instruction will be issued from MSB 510-0 in cycle 6 and thus no new iterations will be performed. The Loop Cycles register 706 is decremented to zero, indicating there are no more instructions in the first iteration.

Cycle 6) The Loop Cycles register 706 has now reached zero so no more instructions will be issued or added from the dispatch unit. The fetch unit can be powered down. No instructions are issued from the MSBs 510 since no active stages have instructions in cycle 0.

Cycle 7) The Mul instruction for the third loop iteration, and the add, and shift instruction for the second loop iteration are issued from MSBs 510-1, 510-2 and 510-3, respectively. No new iterations are to be started, so another 0 is left shifted into the Active Stages register 712.

Cycle 8) No instructions are issued.

Cycle 9) The Add and Shl instructions for the third loop iteration are issued from MSBs 510-2 and 510-3. A zero is left shifted into Active Stages register 712. This register is now all zeroes. The modulo scheduled loop has completed, and the dispatch and fetch units are re-enabled to begin post-loop code execution.

Further advantages and aspects of the present invention will now be described with reference to FIGS. 9 to 14.

As is known, two primary scheduling models exist for non-unit assumed latency (NUAL) architectures. The TI'C6x is an example of the equals model (EQ), where each operation executes for exactly its specified latency, and writes back the result exactly after that latency has expired. Consider the example in FIG. 9. In cycle 0, register r1 is initialized to a value of 1. In cycle 1, the multiply operation begins using the value of 1 for r1. Because the latency of the multiply is 3 cycles, the result of the multiple will not be written back to r1 until the end of cycle 4. Meanwhile, in cycle 2, the value of r1 is guaranteed to still be 1, and the add completes writing a value of 9 to r1. The store of r1 in cycle 3 is also guaranteed to be unaffected by the multiply and will correctly write to memory a value of 9. As can be seen in this example, registers can effectively be reused during long latency operations, often resulting in fewer register needed for a computation. TI calls this particular type of reuse multiple assignment.

The other model is called the less than or equal model (LE). Under this model, the result latency is specified as the maximum time that a particular operation may take to complete and write back its result. In other words, the result may be written back at any time up until and including the cycle at which its latency expires. Coding for this model disallows the register reuse allowed in the equals model. FIGS. 10A, 10B and 10C show the execution of the example code as executed on an EQ machine and on an LE machine where the actual multiply latency varies from three, two, to one, respectively. TI calls this type of register allocation single assignment.

While registers cannot be reused during long latency operations, interrupt handling in code scheduled for the LE model is much simpler. Whenever an interrupt is taken, several instructions are already in the execute pipeline. Precise interrupts are maintained by completing execution of code already in the functional units and squashing code in the fetch or decode units. After processing the interrupt, execution can continue from a single program counter value. From the vantage point of the first instruction after resumption, all instructions scheduled prior to it have completed, even though some may have had a maximum latency well beyond the first instruction after resumption.

Clearly, when scheduling and register allocating for an LE machine, a single assignment methodology must be used. If an instruction finishes early and overwrites a register, another usage of that register might read the new value rather than the old value. However, for an EQ machine, either single assignment or multiple assignment scheduling and allocation may be used. If the instruction is guaranteed to take a certain number of cycles, assuming that it can finished early is a safe, conservative assumption.

Correctly handling interrupts in the LE model is simple, as all instructions that have started executing are allowed to finish. These instructions may finish early (before their maximum latency) relative to instructions that execute after the interrupt is processed. However, scheduling for the LE model required that the code be scheduled with this uncertainty in mind. Likewise, correctly handling interrupts in the EQ model under single assignment it simple, as all instructions prior to the interrupt can be allowed to finish. Since the schedule assumed that they may finish early, the computation will be correct. However, interrupt handling in the EQ model under multiple assignment is more difficult. Consider the situation when an interrupt is taken immediately after instruction 1 in the example in third column of FIG. 9. A precise interrupt cannot be taken because there is no single program counter value where all instructions prior to the PC have been executed and all after have not. The multiply was issued prior to the interrupt and has not yet completed. Furthermore, if that instruction is allowed to complete before the interrupt is actually taken, then the value of r1 would be prematurely overwritten with the result of the multiply. The results of the total computation would be as shown in the last column of FIG. 9. Therefore, in the TI processors, interrupts must be disabled for any portion of the code that use multiple assignment. This is of particular concern for long-running modulo scheduled loops that use multiple assignment. All interrupts must wait until the modulo scheduled loop has completed all iterations. This could significantly delay processing of the interrupts.

Figure 11:
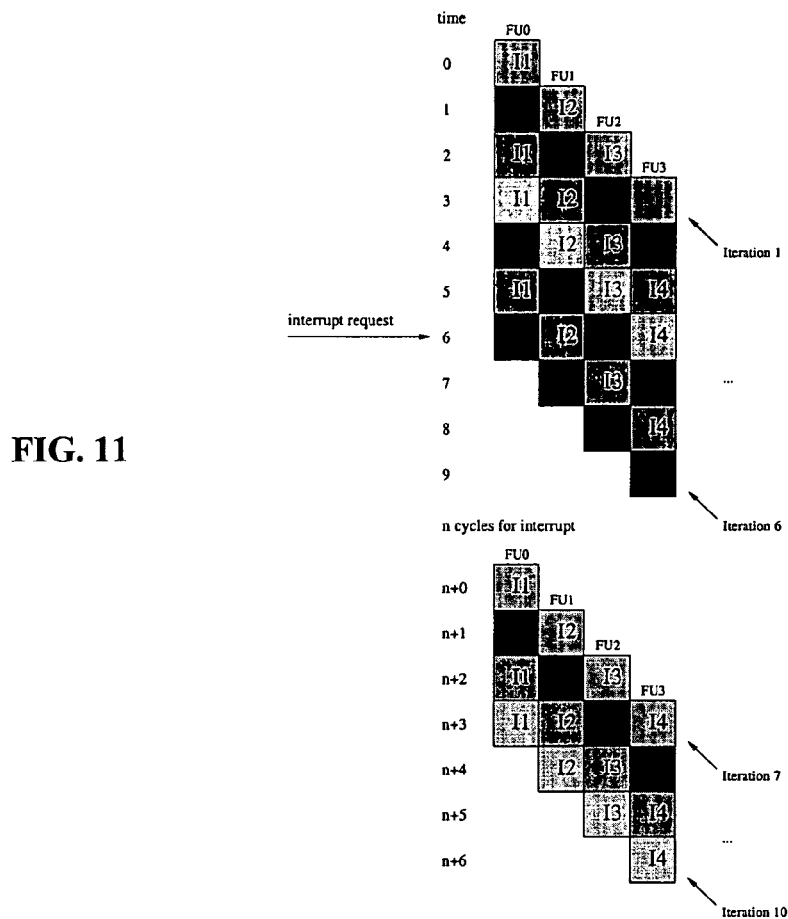
FIG. 11 illustrates interrupt handling using the modulo schedule buffer scheme of the present invention.

However, by using the Modulo Schedule Buffers of the present invention, interrupts will only have to wait until the end of the current loop iteration before they can be processed. This is a benefit of having the control logic actually issuing iterations of the loop. When an interrupt occurs, iterations will stop being issued from the Modulo Schedule Buffers, just like when the last iteration of the loop has been issued, as shown in FIG. 11. This means that the Loop Counter 704 will no longer be decremented, and zeroes will be shifted into the Active Stages Bit Register 712 until all previously issued iterations have completed. At this point, the interrupt can be taken. Note that the current Loop Counter register 704 contains the number of iterations that remain in the loop and will need to be saved across context switches. Upon return from the interrupt, the Modulo Schedule Buffers 510 are cleared, and filling and issue resumes just like when the first iteration was begun, only now with the saved Loop Counter value in register 704.

When a loop is modulo scheduled, the II is chosen to be as small as possible, thus starting successive iterations as early as possible. The limiting factor in choosing an II is often a cross-iteration flow dependence, otherwise known as a recurrence. Such a dependence often consists of a producer operation late in the loop body that feeds a value to an earlier operation in that loop body but in the next iteration. A simple example is an accumulator operation, where the accumulate instruction feeds the result to itself in the next iteration. Therefore, beginning a successive loop iteration before the minimum recurrence II will result in incorrect results because the cross-iteration flow dependence would not have been met.

Figure 12A:
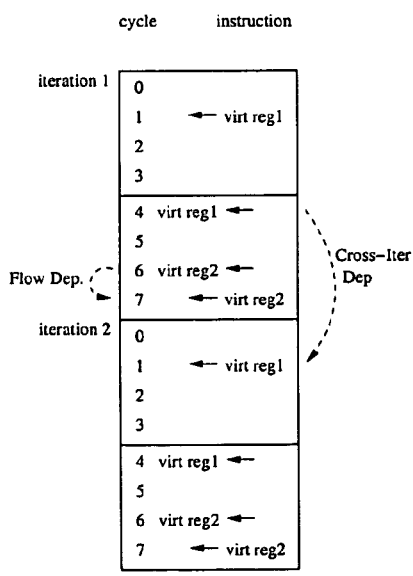
FIG. 12 illustrates register allocation of a sample loop body.
Figure 12B:
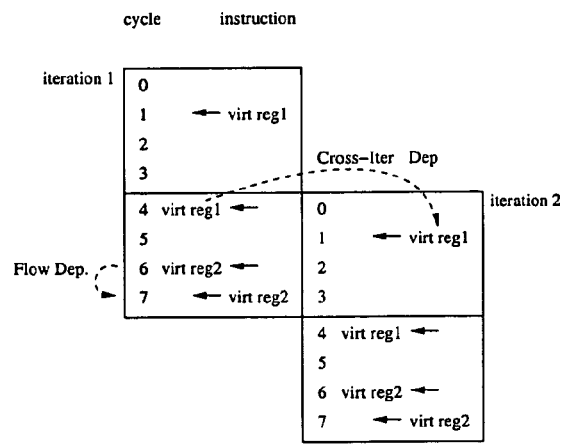
Figure 13:
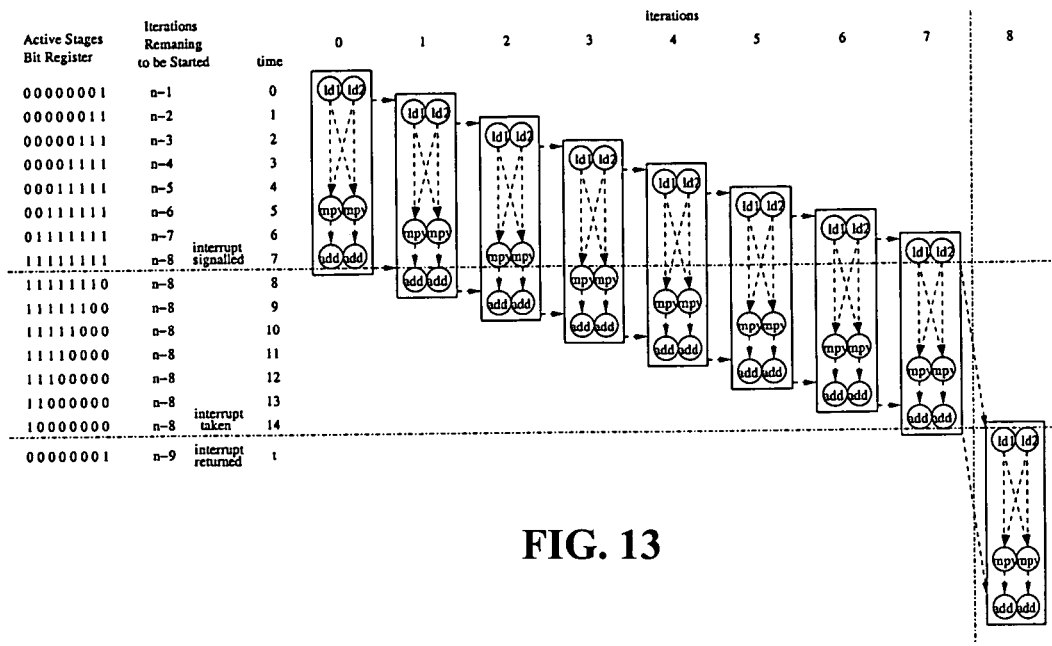
FIG. 13 illustrates an example of an interrupt occurring during execution of a modulo scheduled loop that employs multiple assignment.

However, one can start the next iteration at any time later than the recurrence II, such as after the prior iteration has completed. At the end of each iteration of the loop body, a set of registers and memory locations exist that communicate state to the next iteration. In general practice, these physical registers are not reused for other temporary values, and thus will be live until the next iteration consumes them. Consider the loop body depicted in FIG. 12A. In this example, two virtual registers are used in the loop body, where virtual register 1 is live across the end of the first iteration into the next iteration. When register allocating this loop, two different physical registers are required, as the lifetimes of the two virtual registers overlap. However, a register allocator that understands the effects of modulo scheduling may see the register lifetimes as depicted in FIG. 12B and allocate a single physical register for them both. Such a register optimization must be avoided to properly handle interrupts in the present invention because the values which are live into the next iteration must be preserved. Normally, the II is small enough that no opportunities exist for such a register optimization. Similarly, modern machines that use modulo scheduling generally have enough registers where such an optimization is not necessary. Consider an example loop, depicted in FIG. 13, from Table 6-7 of the TI Programmer's Guide (Texas Instruments, "TMS320C62x/C67x Programmer's Guide," Tech. Rep. SPRU198C, Texas Instruments, Texas, May 1999.) This loop executes a dot product, two terms per cycle, with an II of 1 cycle, and uses multiple assignment.

The loop body consists of two loads that feed 2 multiplies 5 cycles later. The multiplies take two cycles to complete before the results are fed to the adds. Note also the cross-iteration dependences: each load is a post-increment load where the address operand is automatically incremented and passed on to the load in the next iteration; each add is an accumulator which passes its result on to the add in the next iteration.

At the end of cycle zero, the two loads for the first iteration have been executed, there are n−1 iterations which remain to be started, and the Active Stages Bit Register 712 shows that only the first stage (one cycle per stage in this example) is active. In the second cycle, cycle one, the two loads are issued from the Modulo Scheduling Buffers 510 for iteration two, and no instructions are issued for the first iteration. Even though there are no instructions for stage two of the first iteration, the Active Stages Bit Register 712 indicates that the stage is active. In cycle seven, an interrupt request is received. As described earlier, the complexity with multiple assignment is that there are five different outstanding result values for each of the load instructions, values for iterations three through seven. Processing an interrupt at this point would require that all five values be saved along with the timing information in order to switch context, a functionality not present in most architectures. The iterations that have begun executing must be allowed to finish with proper timing in order to obtain the correct results. However, with traditional modulo scheduling, as iterations are allowed to finish, new iterations are begun which also must be allowed to finish, resulting in the rule that such loops must totally complete before processing an interrupt. Or, normal epilogue code could be entered and completed, but then program flow would not be able to restart the loop to finish the iterations without the additional overhead of an encapsulating outer loop to catch this case. The present invention allows for the ability to execute the epilogue code when needed and then to resume later. The loop state is held in the cross-iteration values, as previously mentioned, along with the loop control state maintained by the loop hardware.

One potential drawback to using the Modulo Schedule Buffers scheme of the present invention concerns the execution of loop initialization code. When the instructions for the prologue are completely inserted into the binary, it may be possible to also schedule initialization code in parallel with those prologue instructions. It may also be possible to execute post-loop code in parallel with the epilogue. These optimizations may reduce the total number of cycles required to execute the loop. In the hardware scheme of the present invention, however, such overlap is not possible. The reduction in cycles due to the aforementioned overlap is generally small compared to the cycles spent executing the loop itself.

Many loops have iteration counts that are not determined until run-time. However, the compiler, by using heuristics and profile information, may decide to modulo schedule such loops anyway. Provided that the loop iterates at least as many times as the number of overlapped iterations in the kernel, the fully generated code will work correctly. However, in some code generation schemes, the entire prologue and at least one copy of the kernel must be executed, thus beginning a minimum number of iterations. There are two primary methods for allowing for the short iteration count loops. First, by adding some extra branching instructions to the prologue and possibly some specialized copies of the epilogue, the kernel may be skipped. However, this may significantly increase the code size. Second, rather than execute the modulo scheduled version of the loop at all, another piece of code is branched to that handles short iterations, such as one with a traditional loop structure (called pre- or post-loop conditioning). This, too, increases code size. Unlike either of these two methodologies, the Modulo Schedule Buffer hardware scheme of the present invention automatically handles short iteration count loops, by simply initiating the correct number of iterations.

In many loop bodies, some temporary values must be stored longer than the II. This poses a problem as the write to the register in the second iteration will be completed before the read in first iteration is executed. One method for solving this problem is to require that writes in the overlapped loop iterations actually use different registers, which is called modulo variable expansion (MVE). See, for example, M. S. Lam, "Software pipelining: An effective scheduling technique for VLIW machines," in *Proceedings of the ACM SIGPLAN* 1988 *Conference on Programming Language Design and Implementation*, pp. 318-328, June 1988; B. R. Rau, M. S. Schlansker, and P. Tirumalai, "Code generation schemas for modulo scheduled do-loops and while-loops," Tech. Rep. HPL-92-47, Hewlett Packard Labs, April 1992; and D. M. Lavery, *Modulo Scheduling for Control-Intensive General-Purpose Programs*. Ph.D. thesis, Department of Electrical and Computer Engineering, University of Illinois, Urbana, Ill., 1997. This requires that the several copies of the kernel, one for each different version, execute in round robin fashion.

Figures 14A, 14B, 14C:
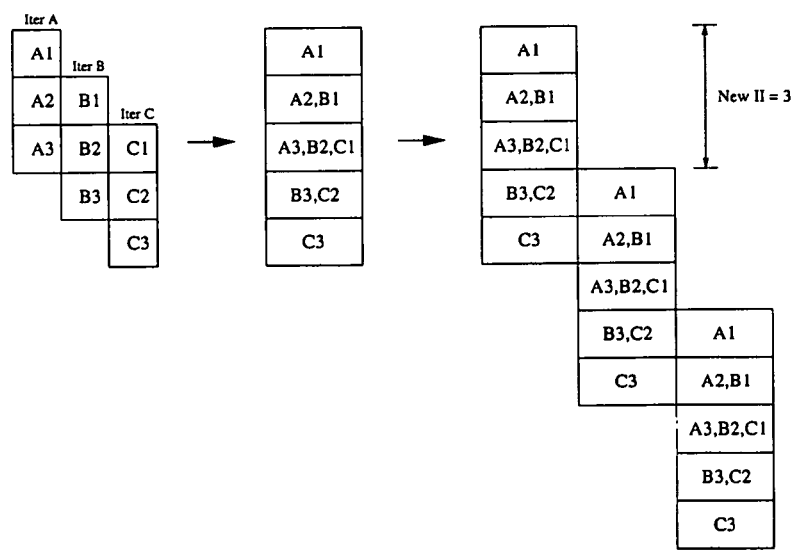
FIG. 14 illustrates an application of MVE from modulo schedule buffers.

The hardware scheme of the present invention may be extended to handle MVE code. The simplest method is to combine the original with the altered iterations into a single code sequence that performs the work of multiple iterations. FIG. 14A shows the loop body, Iter A, with two MVE copies, Iters B and C. The combined loop body is shown in FIG. 14B, along with the new issue pattern and II in FIG. 14C. This scheme requires no clean up code, as the last iteration is always a type C iteration, but does require pre- or post-conditioning if the total number of loop iterations is not divisible by the amount of overlap in the combined loop body.

As mentioned earlier, heavy use of predication can also be used to reduce code size. See J. C. Dehnert, P. Y. Hsu, and J. P. Bratt, "Overlapped loop support in the Cydra 5," in *Proceedings of the Third International Conference on Architectural Support for Programming Languages and Operating Systems*, pp. 26-38, April 1989. Predication allows any instruction to be conditionally executed depending on the value of a predicate, or condition, bit. Predication is often used to eliminate branching by instead setting a predicate bit based on a comparison, then conditionally executing the otherwise branched-to code when that predicate is true.

Predication can also be used in a clever way to support modulo scheduling. With kernel-only modulo scheduling, only the kernel itself need be inserted into the program code, without any prologue or epilogue. The key is to maintain a predicate register for each stage of the modulo schedule, which allows or prevents execution of the instructions for that stage depending on the predicates. In essence, the Active Stages Bit Vector 712 is a set of predicate registers that do exactly the same thing. In kernel-only modulo scheduling, it is the programmer/compiler's responsibility to correctly assign the predicate registers and maintain them at runtime. The architecture does provide assistance in the form of a rotating register file. Each time a new iteration is initiated (II cycles), the names of the registers are shifted by one. Thus the active stages bit register in our scheme is maintained in the predicate register file in the kernel-only scheme, where the shifting happens automatically.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A processor comprising:
    a functional unit adapted to execute an instruction issued to it from a dispatch stage; and
    a buffer in the dispatch stage coupled to the functional unit adapted to receive from a fetch stage and store a plurality of the instructions before issue to the functional unit and further adapted to store scheduling information associated with the instructions,
    wherein the stored plurality of the instructions comprise a set of instructions from a loop body, and wherein the stored scheduling information defines, for each processor cycle in the loop, whether and which of the stored instructions are to be executed in that processor cycle, such that for a first processor execution cycle, the stored scheduling information is used to determine a first one of the stored instructions to be selected and issued to the functional unit from the buffer, and such that for a second different processor execution cycle, the stored scheduling information is used to determine a second one of the stored instructions to be selected and issued to the functional unit from the buffer.

2. A processor according to claim 1, further comprising:
    a decode stage register coupled between the dispatch stage and the functional unit, the functional unit coupled to the decode stage register for executing the instruction issued to the decode stage register from the dispatch stage.

3. A processor according to claim 2, wherein the set of instructions consists of a kernel set of loop instructions, the processor further comprising:
    control logic coupled to the buffer, the control logic being operative so that the functional unit executes a number of loop iterations of the stored kernel set of loop instructions, a prologue set of loop instructions different than the stored kernel set of loop instructions, and an epilogue set of loop instructions different than the stored kernel set of loop instructions based on the stored kernel set of loop instructions and received loop parameters.

4. A processor according to claim 3, wherein the received loop parameters include a loop iteration initiation parameter, a loop iteration parameter and a loop cycles parameter, the control logic including:
    an iteration initiation interval register for storing the loop iteration initiation parameter;
    a loop iteration register for storing the loop iteration parameter; and
    a loop cycles register for storing the loop cycles parameter.

5. A processor according to claim 3, further comprising a fetch unit, wherein the control logic is further operative so that the fetch unit can be shut down during execution of the prologue, kernel and epilogue sets of loop instructions.

6. A processor according to claim 3, wherein the kernel set of loop instructions comprise modulo variable expansion (MVE) code.

7. A processor according to claim 3, wherein the control logic is operative to allow interrupts to be handled at the end of a current loop iteration.

8. A processor according to claim 1, further comprising:
    control logic coupled to the buffer adapted to cause a certain one of the stored plurality of instructions to be issued to the functional unit in accordance with a loop iteration stage and the stored scheduling information associated with the certain instruction.

9. A processor according to claim 8, wherein the control logic is further adapted to cause the certain one of the instructions to be issued in accordance with a cycle within the loop iteration stage and the stored scheduling information associated with the certain instruction.

10. A processor according to claim 9,
    wherein the scheduling information comprises a plurality of loop stage bit masks respectively associated with the plurality of instructions, and
    wherein the control logic is further adapted to cause the certain one of the instructions to be issued in accordance with the respective one of the loop stage bit masks associated with the certain one of the instructions.

11. A processor according to claim 8,
wherein the scheduling information comprises a plurality of loop stage bit masks respectively associated with the plurality of instructions, and
wherein the control logic is further adapted to cause the certain one of the instructions to be issued in accordance with the respective one of the loop stage bit masks associated with the certain one of the instructions.

12. A processor according to claim 8, wherein the stored set of instructions consists of a kernel set of loop instructions, and wherein the control logic is operative so that the functional unit executes a number of loop iterations of the kernel set of loop instructions, a prologue set of loop instructions different than the stored kernel set of loop instructions, and an epilogue set of loop instructions different than the stored kernel set of loop instructions in accordance with the stored kernel set of loop instructions and received loop parameters.

13. A processor according to claim 12, wherein the received loop parameters include a loop iteration initiation parameter, a loop iteration parameter and a loop cycles parameter, the control logic including:
an iteration initiation interval register for storing the loop iteration initiation parameter;
a loop iteration register for storing the loop iteration parameter; and
a loop cycles register for storing the loop cycles parameter.

14. A processor according to claim 12, wherein the kernel set of loop instructions comprise modulo variable expansion (MVE) code.

15. A processor according to claim 8, further comprising a fetch unit, wherein the control logic is further operative so that the fetch unit can be shut down during execution a number of iterations of the loop body corresponding to the stored plurality of instructions.

16. A processor according to claim 8, wherein the control logic is further operative to allow interrupts to be handled at the end of a current loop iteration.

17. A processor according to claim 1, wherein the scheduling information comprises a plurality of loop stage bit masks respectively associated with the plurality of instructions.

18. A processor according to claim 1, further comprising:
control logic coupled to the buffer, the control logic including:
an iteration initiation interval register for storing a loop iteration initiation parameter;
a loop iteration register for storing a loop iteration parameter; and
a loop cycles register for storing a loop cycles parameter,
wherein the control logic is adapted to cause the plurality of instructions to be issued to the functional unit from the buffer in accordance with the loop iteration initiation parameter, the loop iteration parameter, the loop cycles parameter and the stored scheduling information.

19. A processor according to claim 18, further comprising a fetch unit, wherein the control logic is further operative so that the fetch unit can be shut down during execution of a number of iterations of the loop body corresponding to the stored plurality of instructions.

20. A processor according to claim 18, wherein the control logic is further operative to allow interrupts to be handled at the end of a current loop iteration.

21. A processor according to claim 1, wherein the set of instructions consists of a kernel set of loop instructions, the processor further comprising:
control logic coupled to the buffer, the control logic being operative so that the functional unit executes a number of loop iterations of the stored kernel set of loop instructions, a prologue set of loop instructions different than the stored kernel set of loop instructions, and an epilogue set of loop instructions different than the stored kernel set of loop instructions based on the stored kernel set of loop instructions and received loop parameters.

22. A processor according to claim 21, wherein the received loop parameters include a loop iteration initiation parameter, a loop iteration parameter and a loop cycles parameter, the control logic including:
an iteration initiation interval register for storing the loop iteration initiation parameter;
a loop iteration register for storing the loop iteration parameter; and
a loop cycles register for storing the loop cycles parameter.

23. A processor according to claim 21, further comprising a fetch unit, wherein the control logic is further operative so that the fetch unit can be shut down during execution of the prologue, kernel and epilogue sets of loop instructions.

24. A processor according to claim 21, wherein the kernel set of loop instructions comprise modulo variable expansion (MVE) code.

25. A processor according to claim 21, wherein the control logic is further operative to allow interrupts to be handled at the end of a current loop iteration.

26. A processor for executing a number of iterations of a loop, the loop including a prologue set of loop instructions, a kernel set of loop instructions and an epilogue set of loop instructions in accordance with a modulo schedule, the processor comprising:
a plurality of functional units; and
a dispatch stage coupled to the functional units for issuing instructions to the functional units, the dispatch stage including:
a plurality of buffers respectively associated with the plurality of functional units adapted to store the kernel set of loop instructions, and each buffer further adapted to store a different set of scheduling information associated with the respective functional unit and the stored instructions; and
control logic coupled to the plurality of buffers for causing the stored kernel set of instructions to be selectively issued to the respective functional units in accordance with the stored scheduling information, the control logic being operative so that the functional units execute the number of iterations of the kernel set of loop instructions, the prologue set of loop instructions and the epilogue set of loop instructions based on the stored kernel set of loop instructions and associated sets of scheduling information, wherein during a first processor cycle, the control logic uses the sets of scheduling information to cause a portion of the prologue set of loop instructions to be issued to the respective functional units from the buffers, and wherein during a second processor cycle after the first processor cycle, the control logic uses the sets of scheduling information to cause a portion of the kernel set of loop instructions to be issued to the respective functional units from the buffers, and wherein during a third processor cycle after the second processor cycle, the control logic uses the sets of scheduling information to cause a portion of the epilogue set of loop instructions to be issued to the respective functional units from the buffers.

27. A processor according to claim 26, further comprising a fetch unit, wherein the control logic is further operative so that the fetch unit can be shut down during execution of the number of iterations of the loop.

28. A processor according to claim 26, wherein the control logic is further operative to allow interrupts to be handled at the end of a current one of the number of loop iterations, and to complete the number of loop iterations after the interrupt is handled.

29. A processor according to claim 1, wherein the buffer is further adapted to subsequently receive from the fetch stage and store a second different plurality of the instructions, thereby overwriting the previously stored plurality of instructions, before issue to the functional unit and further adapted to store second different scheduling information associated with the second plurality of instructions, wherein the second plurality of the instructions comprise a set of instructions from a second different loop body, and wherein the second instructions are issued to the functional unit from the buffer in accordance with the stored second scheduling information so as to cause the functional unit to execute a second number of iterations of the second loop body.

* * * * *